United States Patent [19]

Dyer

[11] Patent Number: 5,094,928
[45] Date of Patent: Mar. 10, 1992

[54] MODULAR FUEL CELL ASSEMBLY
[75] Inventor: Christopher K. Dyer, Chatham, N.J.
[73] Assignee: Bell Communications Research, Inc., Livingston, N.J.
[21] Appl. No.: 512,117
[22] Filed: Apr. 20, 1990
[51] Int. Cl.[5] .............................................. H01M 8/10
[52] U.S. Cl. ........................................ 429/33; 429/44; 429/94
[58] Field of Search ..................... 429/30, 32, 33, 40, 429/42, 44, 12, 94, 191, 210; 29/623.5; 427/115

[56] References Cited

U.S. PATENT DOCUMENTS

| | | | |
|---|---|---|---|
| 3,423,243 | 1/1969 | Kordesch et al. | 429/12 |
| 3,505,114 | 4/1970 | Rohr | 429/32 |
| 4,824,741 | 4/1989 | Kunz | 429/34 X |
| 4,857,420 | 8/1989 | Maricle et al. | 429/30 X |
| 4,863,813 | 9/1989 | Dyer | 429/33 |
| 4,876,163 | 10/1989 | Reichner | 429/30 |
| 4,913,982 | 4/1990 | Kotochick et al. | 429/12 |

OTHER PUBLICATIONS

"Oxides and Oxide Films", Edited by J. W. Diggle and N. K. Vijh, vol. 4, Marcer Dekker, vol. 4, pp. 169–253, New York, 1976.

Primary Examiner—Anthony Skapars
Attorney, Agent, or Firm—James W. Falk; Leonard Charles Suchyta

[57] ABSTRACT

Two or more individual fuel cells are connected together to form a modular assembly whose output voltage is two or more times that of a single cell. Corrugated current collectors interconnect adjacent cells and allow a required fuel/oxidizer mixture to have access to virtually the entire surface area of one side of each of the interconnected cells. Such a modular assembly is advantageously made by a continuous fabrication process. Each assembly is packaged in either a flat or a spiral form.

14 Claims, 3 Drawing Sheets

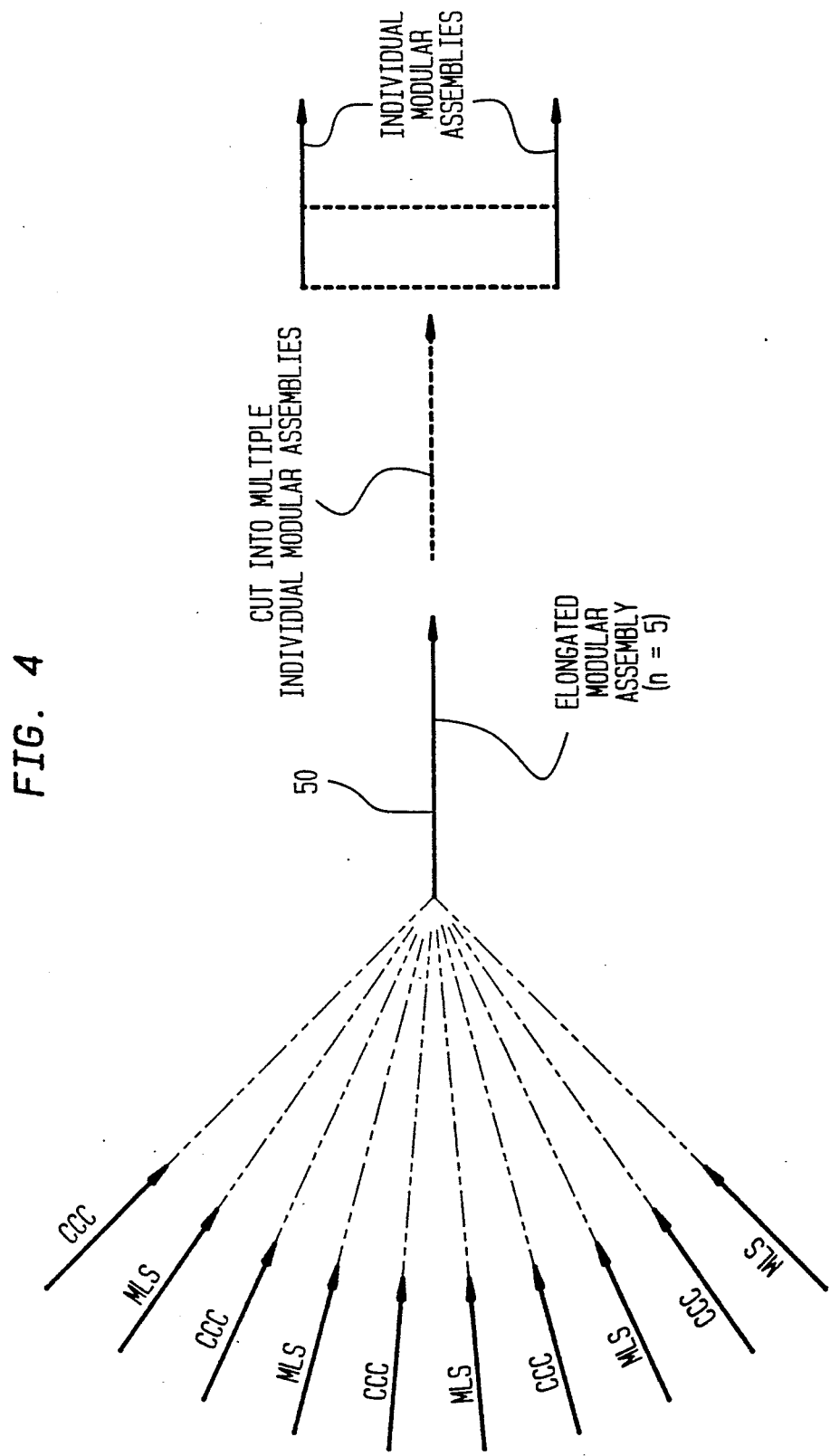

MODULAR FUEL CELL ASSEMBLY

BACKGROUND OF THE INVENTION

This invention relates to fuel cells and, more particularly, to cells which consume gaseous or liquid fuels and produce electrical energy.

An advantageous fuel cell for energy conversion is described in my U.S. Pat. No. 4,863,813. In a cell of the type described therein, a hydrogen-containing material at room temperature, such as a gaseous mixture of hydrogen and oxygen, is directly converted to direct-current electrical energy and the only reaction product is water.

In one specific illustrative such cell, a submicrometer-thick gas-permeable ionically conducting membrane made of pseudoboehmite is deposited on an electrode that comprises a platinized impermeable substrate. A layer, of platinum for example, is deposited on the top surface of the membrane to form the second electrode of the cell. The second electrode is porous enough to allow the gas mixture to pass into the membrane.

For a hydrogen/air fuel mixture, such a cell provides useful current at an output voltage as large as about one volt, independent of the ratio of hydrogen to air for hydrogen > 50%. While this value of output voltage is adequate for many applications of practical interest, I recognized that it would be desirable to try to devise a version of the basic cell that is capable of providing higher voltage and power. Such a version, particularly if it were adapted to be made by low-cost continuous fabrication techniques, would significantly increase the applications for which the cell would be regarded as an attractive energy source.

SUMMARY OF THE INVENTION

In accordance with the principles of the present invention, n fuel cells each of the type mentioned above are connected in series to provide a modular assembly whose output voltage is n times that of a single cell. The assembly includes a corrugated current collector interposed between adjacent cells to directly connect the cathode electrode of one cell to the anode of the next. Such a collector is designed to ensure that the fuel mixture has easy access to virtually the entire surface area of the porous electrode of each cell.

In further accord with the invention, constituent elements of the modular assembly are advantageously made in elongated form in a continuous fabrication process. Subsequently, the elongated elements are combined to form an elongated assembly which may then be cut into sections to form multiple individual modular assemblies.

Any number of individual modular fuel cell assemblies made in accordance with this invention can be integrated into an assembly that includes only two external connections. Such an assembly may be packaged as a flat stack of basic cells having planar-surface external connections. Or the assembly may be rolled to form a compact spiral package whose outer surface constitutes one electrode of the assembly. In the spiral package, a longitudinally extending conductive element is disposed in contact with the inner surface of the spiral assembly to form the other electrode of the assembly.

BRIEF DESCRIPTION OF THE DRAWING

A complete understanding of the present invention and of the above and other features and advantages thereof will be apparaent from a consideration of the detailed description below taken in conjunction with the accompanying drawing, not drawn to scale, in which:

and FIG. 4 is a simplified diagrammatic depiction that illustrates the way in which the modular assembly of FIG. 1 can be made in a continuous batch fabrication process.

DETAILED DESCRIPTION

Figure 1:
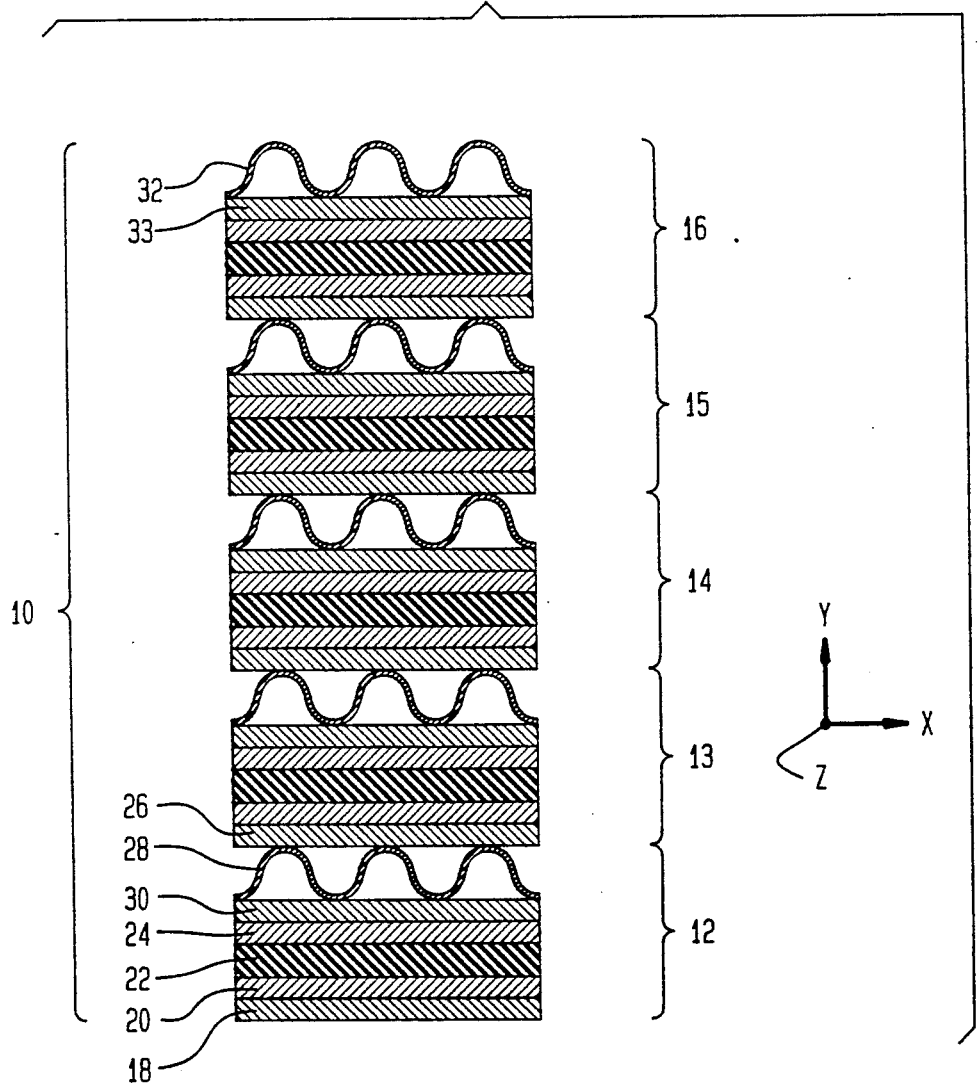
FIG. 1 is a representation in cross-section of a specific illustrative modular fuel cell assembly made in accordance with the principles of the present invention.

For purposes of a particular illustrative example, FIG. 1 shows a specific modular assembly 10 made in accordance with the principles of the present invention in which five identical fuel cells are interconnected in series. In general, the invention is applicable to the interconnection of n such cells, where n is a positive integer having a value of at least two.

Advantageously, each of the n (n=5) series-connected cells shown in FIG. 1 is of the type described in the aforementioned U.S. Pat. No. 4,863,813. The depicted assembly is capable of providing an output voltage that is five times that of a single cell. Thus, for example, the FIG. 1 assembly provides an output voltage of approximately five volts.

In accordance with the invention, a suitable mixture of a fuel and an oxidizer is directed at the assembly 10 of FIG. 1 in a direction that is parallel to the indicated Z direction. As described in detail later below, the cells of the assembly 10 are structured to permit the mixture to have access to substantially the entire surface area of the top layer of a multi-layered portion of each cell.

Suitable fuels that are consumed by assemblies made in accordance with the invention in order to produce electrical energy are hydrogen-containing materials such as hydrogen, methane and methanol. The fuels can be in liquid or gaseous form.

Further, many suitable oxidizers or oxidizer species are available for combining with the fuel to provide a mixture for powering the assembly 10. In practice, the most common oxidizer is gaseous oxygen or air.

The bottom-most cell 12 shown in FIG. 1 will be described in detail. The other interconnected cells 13 through 16 of FIG. 1 are each identical to the cell 12. Each of the five cells comprises a multi-layered structure and a corrugated current collector.

The bottom-most layer 18 of the cell 12 (FIG. 1) constitutes a conductive layer that serves as a current collector and catalyst support. Illustratively, the layer 18 comprises a metallic foil or tape made, for example, of aluminum or nickel. Or the layer 18 may be a tape made of a standard conductive polymer. Alternatively, the layer 18 may comprise a film of a conductive material such as aluminum or nickel deposited on a carrier tape made, for example, of a conductive polymer.

To ensure that the assembly shown in FIG. 1 exhibits a relatively high power density in a compact size, it is advantageous that the top surface of the layer 18 have an irregular surface. Such irregularities may be inherent in the conductive materials utilized to form the top surface of the layer 18. If irregularities are not inherent in the surface, the surface can be processed in a standard way, for instance by etching, to achieve the desired irregularities. In either case, what is desired in an actual surface area that is, for example, about an order of magnitude greater than the apparent area of the layer 18 as measured by its overall dimensions in the indicated X and Z directions.

Overlying the layer 18 of the cell 12 of FIG. 1 is a thin catalyst layer 20. As described in U.S. Pat. No. 4,863,813, various materials are suitable for forming such a catalyst layer. These materials include platinum, palladium and alloys of platinum and palladium. Such a layer is formed by a standard deposition process to a thickness of, for example, about 1000-to-5000 nanometers (nm). In practice, the area of the surface of the thin layer 20 corresponds closely to that of the underlying layer 18. Together, the layers 18 and 20 are designed to be impermeable to the aforespecified mixture of fuel and oxidizer.

As will be described in more detail later below, formation of the catalyst layer 20 on the conductive support layer 18, as well as the formation of additional layers (to be described) on the layer 20, can easily be carried out in a continuous fabrication process to form an elongated multi-layered structure. In that way, multiple elongated constituent parts capable of forming many individual modular assemblies each of the type shown in FIG. 1 can be made in a high-speed low-cost way.

Layer 22 that overlies the catalyst layer 20 of the cell 12 (FIG. 1) comprises a solid electrolyte. In accordance with this invention, and as described in more detail in U.S. Pat. No. 4,863,813, the layer 22 is made of a material that is characterized by a usefully high conductivity for hydrogen ions (H+) or hydronium ions (H$_3$O+). Additionally, the layer 22 is permeable to the fuel, to the oxidizer and to the product of the reaction between the fuel and oxidizer. Further, the layer 22 constitutes an electron insulator, with a resistivity of at least about $10^6$ ohm-centimeters. Also, in preferred embodiments the solid electrolyte is capable of being made in very thin layers, often below one micrometer ($\mu$m) in thickness.

In accordance with the principles of the present invention, two classes of solid-electrolyte materials are suitable for forming the layer 22 shown in FIG. 1. One class consists of selected hydrated aluminum oxides. The other class consists of selected polymeric materials.

The physical properties and conditions for forming layers of hydrated aluminum oxide have been extensively studied. A review of many of these studies appears as Chapter 3 of "Oxides and Oxide Films", edited by J. W. Diggle and N. K. Vijh, volume 4, Marcer Dekker, New York, 1976, pages 169-253. Depending on the particular conditions, the product of the reaction between aluminum and water includes boehmite, pseudoboehmite, bayerite, gibbsite and combinations of these materials. One of these materials, pseudoboehmite, has been found to be particularly appropriate for inclusion in devices made in accordance with the invention. Layers including at least 50% pseudoboehmite are preferred, layers including at least 95% pseudoboehmite being most preferred.

Suitable permeable solid-electrolyte layers of hydrated aluminum oxide can be produced by several methods. For example, such a layer forms on a clean metallic aluminum surface exposed to water in liquid form in a container or exposed to water in vapor form in a chamber in a temperature range of about 20-to-374 degrees Celsius. Pseudoboehmite is predominant in layers produced in the temperature range from approximately 90-to-100 degrees Celsius. Solid-electrolyte layers can also be produced by exposing aluminum oxide to water and/or liquid vapor phases. The pseudoboehmite form is predominant in layers produced in the temperature range of about 90-to-100 degrees Celsius.

Suitable aluminum oxide layers can also be produced by anodization of metallic aluminum. Thicker layers can be produced by a multi-layer process that includes alternate steps of aluminum deposition and exposure of the aluminum or anodized aluminum surface to water. Radio-frequency backsputtering can be used during deposition of the metallic aluminum prior to water exposure. Such backsputtering can improve the uniformity of coverage of the aluminum and therefore also of the permeable solid-electrolyte layer.

The production of a hydrated aluminum oxide layer from an anodically formed aluminum oxide layer has the advantage that such a layer is characteristically of a very uniform thickness and can be grown precisely to a specified thickness. In the multi-layer process comprising sequential aluminum depositions, solid-electrolyte layers of approximately 500 nm thickness have been produced with 3-to-5 sequential processing steps. More generally, hydrated aluminum oxide layers about 300 nm-to-10 $\mu$m thick are suitable for forming the solid-electrolyte layer 22 shown in FIG. 1.

Additionally, carbon-based polymeric materials are known which possess the required hydrogen ion conductivity, electronic resistivity and permeability to fuel, oxidizer and products of the reaction between them. Perfluorinated sulfonic acid is an example of a polymer in which ionic hydrogen species can be readily mobilized. This supplies the necessary hydrogen ion mobility. Such polymers commonly have sufficient gas permeability and electronic resistance to be useful as solid electrolytes in assemblies made in accordance with the principles of the present invention.

One specific illustrative polymeric material suitable for forming the solid-electrolyte layer 22 (FIG. 1) is the commercially available perfluorinated sulfonic acid polymer known as Nafion. In practice, this material is much easier to use than pseudoboehmite because Nafion can be solution-cast to form thin layers in the range of about 1-to-10 $\mu$m. Such a fabrication technique is particularly compatible with the continuous process described later below and represented in FIG. 4.

As indicated in FIG. 1, a layer 24 overlies the solid-electrolytes layer 22. The layer 24 comprises a permeable catalytic electrode made of a material such as, for example, platinum, palladium or alloys of platinum and palladium. The layer 24 is permeable in the sense that it permits the fuel/oxidizer mixture to pass into the solid-electrolyte layer 22. Illustratively, this can be realized by sputtering a thin inherently porous layer, up to, for example, a thickness of about 100 nm, on the top surface of the layer 22. For a thicker layer that does not inherently exhibit the required porosity to the fuel/oxidizer mixture, the layer 24 can be rendered permeable by forming therein a pattern of through-apertures.

Both of the layers 20 and 24 must be made of a material that is catalytic to the appropriate half-cell reaction. At one electrode of each cell, a surplus supply of electrons and positive ions are conducted through the solid-electrolyte layer 22. At the other electrode of each cell, the material must be catalytic to the reaction that consumes surplus electrons and neutralizes excess positive ionic charge in the electrolyte by, for example, generating negative ions. A large number of metallic materials are known to be catalytic to such reactions. Of particular interest are materials such as platinum, palladium, gold, nickel and various alloys that include these materials. Other suitable catalytic materials include non-metals such as electronically conducting mixed oxides with a spinel or perovskite structure.

In accordance with the principles of the present invention, electrical contact is made to the catalytic layer 24 of the cell 12 shown in FIG. 1 by an instrumentality that does not significantly interfere with the passage of the fuel/oxidizer mixture to the surface of the layer 24. Moreover, the instrumentality is effective to establish electrical contact to the current collector (bottom-most layer 26) of the next adjacent cell 13 of the FIG. 1 assembly.

In accordance with a specific illustrative embodiment of the present invention, the aforementioned instrumentality shown in FIG. 1 comprises a conductive corrugated current collector 28. It is feasible for spaced-apart portions of the collector 28 to be in direct electrical contact with the top surface of the layer 24. But, as indicated in FIG. 1, it is generally advantageous to interpose a conductive permeable member 30 between the corrugated collector 28 and the porous layer 24 to improve electrical contact therebetween and thereby reduce the internal resistance of the depicted assembly.

By way of example, the current collector 28 shown in FIG. 1 comprises a corrugated strip of a conductive material such as aluminum foil or tape. Alternatively, the collector 28 may comprise a corrugated strip of a conductive polymeric foil or tape.

The member 30 of FIG. 1 comprises, for example, a standard conductive polymer that is permeable to the fuel/oxidizer mixture. Many polymers are known which possess the required permeability and electronic conductivity to serve as the member 30. Alternatively, the member 30 may comprise a layer of a conventional carbonfiber-mesh material. Such a material also exhibits the requisite permeability and electronic conductivity.

As indicated in FIG. 1, five cells each identical to the cell 12 described in detail above are electrically interconnected in series to form an assembly whose output voltage is five times that of one cell. In the herein-described assembly, the bottom-most layer 18 constitutes the positive terminal of the structure. Corrugated current collector 32 at the top of the assembly 10 comprises the negative terminal, of the structure. (In some assemblies in which the final package design does not block access of the fuel/oxidizer mixture to the top of the cell 16, the top-most current collector 32 may be omitted. In that case, electrical contact can be made directly to conductive layer 33 which would then constitute the negative terminal of the structure.)

In FIG. 1, the depicted corrugated current collectors (except for the top-most one 32) each serve to directly connect the negative terminal of one cell to the positive terminal of the next adjacent cell. Thus, for example, the collector 28 connects the layer 24 (negative terminal) of the cell 12 to the layer 26 (positive terminal) of the cell 13 either directly or through the intermediary of the conductive layer 30.

In one specific illustrative embodiment of the principles of the present invention, each of the multi-layered structures shown in FIG. 1, such as the structure comprising the layers 18, 20, 22, 24 and 30, has Z-direction and X-direction dimensions of approximately 5 and 20 centimeters, respectively. In that embodiment, the corrugated current collector 28 is formed from a flat strip of material about 125 $\mu$m thick having Z-direction and X-direction dimensions of approximately 5 and 20 centimeters, respectively. Illustratively, the Y-direction distance from the top surface of the layer 30 of the cell 12 to the bottom surface of the layer 26 of the cell 13 of that embodiment is about 500 $\mu$m.

In practice, modular assemblies of the type represented in FIG. 1 may be packaged in a variety of ways. Two specific illustrative such ways are respectively depicted in FIGS. 2 and 3.

Figure 2:
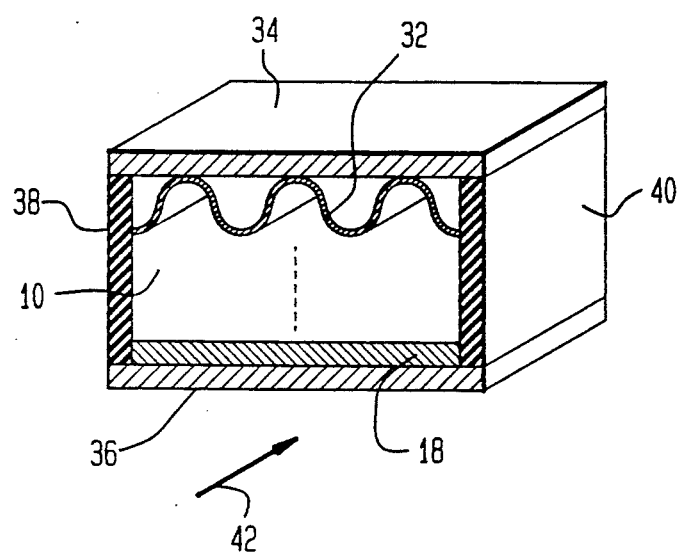
FIG. 2 illustrates a particular manner in which an assembly of the type depicted in FIG. 1 can be packaged as a flat stack having planar-surface external connections.

In FIG. 2, the modular assembly 10 of FIG. 1 is shown placed intact within a container that comprises conductive top and bottom members 34 and 36, thereby to form a flat-stack package. Side members 38 and 40 of the container are made of an electrically insulating material. The top-most corrugated current collector 32 of the assembly 10 contacts the conductive top member 34, whereas the bottom-most layer 18 of the assembly 10 contacts the conductive bottom member 36. Thus, the members 34 and 36 comprise planar-surface positive and negative terminals, respectively, of the overall package.

The front and back of the FIG. 2 container are open. The required fuel/oxidizer mixture flows in the direction of arrow 42 into the front of the container. Water, the sole by-product of the reaction that occurs in the depicted fuel cell assembly based on a mixture of hydrogen and oxygen, leaves the container through its open back.

Figure 3:
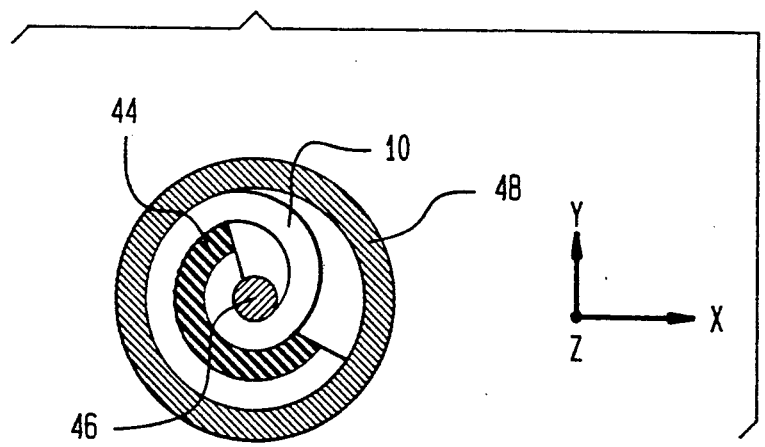
FIG. 3 shows an assembly of the FIG. 1 type rolled to form a spiral.

FIG. 3 shows a modular assembly 10 of the FIG. 1 type that has been rolled to form a compact spiral package. Illustratively, the spiral is formed by moving the left-hand side of the FIG. 1 assembly in an upwards direction and then rolling the assembly in the indicated X direction. In that case, the outside surface of the package comprises the bottom-most layer 18 (positive electrode) of the herein-considered multi-cell assembly 10.

In practice, before rolling the FIG. 1 assembly to form a spiral, it is advantageous to place an electrically insulating tape or foil over a portion of the top-most corrugated current collector 32. Such an insulator, which is designated by reference numeral 44 in FIG. 3, ensures that in a tight spiral the layer 18 and the current collector 32 will not be shorted together. Alternatively, a suitable insulating material may be deposited only on the tops of a portion of the collector 32 to achieve the same result.

In FIG. 3, a longitudinally extending conductive rod 46 whose main axis is parallel to the indicated Z axis is shown in electrical contact with one surface of the rolled assembly 10. In particular, the rod 46 is designed to be in direct electrical contact with a portion of the corrugated current collector 32 (FIG. 1). Thus, the rod 46, which may, for example, be made of aluminum, constitutes the negative electrode of the spiral package.

The spiral package assembly of FIG. 3 is shown placed in an open-ended container 48. By way of example, the container 48 is made of a conductive material such as aluminum. In that case, the outside surface of the container 48 comprises the positive electrode of the packaged multi-cell assembly 10. In operation, the required fuel/oxidizer mixture flows in a direction parallel to the indicated Z axis into one end of the container 48.

FIG. 4 illustrates in a simplified diagrammatic fashion the manner in which modular assemblies of the type described herein may be made in a relatively low-cost way in a continuous fabrication process. In FIG. 4, each arrow designated CCC is intended to represent the continuous fabrication of an elongated corrugated current collector such as one of the collectors 28 . . . 32 shown in FIG. 1. Each arrow designated MLS is intended to represent the continuous fabrication of an elongated multi-layered structure such as the part of the FIG. 1 structure that comprises the layers 18, 20, 22, 24 and 30.

Thus, as indicated in FIG. 4, elongated CCC and MLS constituents of a modular assembly made in accordance with this invention are individually fabricated in a continuous way and then brought together in an interleaved fashion. Illustratively, for the purpose of forming an elongated assembly from which multiple individual modular assemblies each of the particular FIG. 1 type (n=5) may be formed, five CCC constituents and five MLS constituents are represented in FIG. 4. When interleaved, these constituent parts form an elongated version of the particular modular assembly shown in FIG. 1. In FIG. 4, this elongated version is represented by arrow 50. Subsequently, the elongated version is cut into multiple equal-length sections each identical to the modular assembly of FIG. 1.

Finally, it is to be understood that the various specific arrangements described herein are only illustrative of the application of the principles of the present invention. In accordance with these principles, numerous alternatives and modifications may easily be made by those skilled in the art without departing from the spirit and scope of the invention.

What is claimed is:

1. A modular fuel cell assembly comprising
n fuel cells, where n is a positive integer having a value of at least 2, each of said cells including a first electrode arrangement and a second electrode arrangement separated by and in contact with a solid-electrolyte body, wherein said first electrode arrangement is permeable to a fuel and an oxidizer, wherein said second electrode arrangement is impermeable to the fuel and the oxidizer, and wherein the solid-electrolyte body consists essentially of an electronically insulating material that is also ionically conducting to at least a first ionic species and which material is permeable to the fuel, to the oxidizer and to the products of electrochemical reactions of this fuel and oxidizer,
and current collecting means that is permeable to the fuel and the oxidizer electrically connecting the first electrode arrangement of a cell to the second electrode arrangement of the next adjacent cell in the series connection of cells.

2. An assembly as in claim 1 wherein said current collecting means comprises a conductive corrugated member.

3. An assembly as in claim 2 wherein said first electrode arrangement of each cell comprises a permeable layer of a catalytic material in contact with said solid-electrolyte body.

4. An assembly as in claim 3 wherein said second electrode arrangement of each cell comprises a conductive carrier member having a layer of a catalytic material deposited on said carrier member and in contact with said solid-electrolyte body.

5. An assembly as in claim 4 wherein said first electrode arrangement of each cell further comprises a permeable conductive layer interposed between said permeable catalytic layer and said conductive corrugated member.

6. An assembly as in claim 5 wherein said permeable conductive layer comprises a material selected from the group consisting of a permeable conductive polymer and a carbon-fiber-mesh material.

7. An assembly as in claim 1 wherein the fuel comprises at least one member of the group consisting of hydrogen, methane and methanol, and wherein the oxidizer comprises oxygen.

8. An assembly as in claim 7 wherein said current collecting means comprises a corrugated member selected from the group consisting of a metal and a conductive polymer.

9. An assembly as in claim 8 wherein said first electrode arrangement of each cell comprises a permeable layer of a catalytic material in contact with said solid-electrolyte body, said permeable layer being selected from the group consisting of platinum, palladium, gold, nickel, alloys of platinum, palladium, gold and nickel, and electronically conducting mixed oxides.

10. An assembly as in claim 9 wherein said second electrode arrangement of each cell comprises a conductive carrier member comprising a material selected from the group consisting of a metal and a conductive polymer, and wherein a catalyic material is deposited on said carrier member in contact with said solid-electrolyte body, said last-mentioned catalytic material being selected from the group consisting of platinum, palladium, gold, nickel, alloys of platinum, palladium, gold and nickel, and electronically conducting mixed oxides.

11. An assembly as in claim 10 wherein said solid-electrolyte body comprises a material selected from the group consisting of a hydrated oxide of aluminum and a carbon-based polymer.

12. An assembly as in claim 1 further including
means, including two parallel spaced-apart conductive planer members, for containing said series-connected cells as a flat-pack assembly, one planar member being in electrical contact with the current collecting means that is connected to the first electrode arrangement of an end cell of the series-connected cells, and the other planar member being in electrical contact with the second electrode arrangement of the other end cell of said series-connected cells, said containing means including openings through which the fuel and the oxidizer can enter and the product of the fuel cell reactions can leave.

13. An assembly as in claim 1 wherein said series-connected cells are rolled to form a spiral package, and further including a conductive member within said spiral package and in contact with one of said current collecting means and said second electrode means to constitute one output terminal of said spiral package, the outer surface of said spiral package constituting the other output terminal thereof.

14. An assembly as defined in claim 1 made by a method comprising the steps of
forming at least two individual physically separate elongated fuel cells in a continuous fabrication process, forming at least two individual elongated current collecting means in a continuous fabrication process, interleaving said elongated fuel cells and current collecting means to form an elongated assembly in which at least two elongated fuel cells are connected in series to provide an output voltage that is at least two times that of an individual cell, and cutting said elongated assembly into sections to form multiple individual fuel cell assemblies each of which comprises series-connected cells.

* * * * *